United States Patent [19]
Bove et al.

[11] Patent Number: 5,901,444
[45] Date of Patent: May 11, 1999

[54] ASSIST METHOD FOR FITTING CLOSE TOLERANCE VALVES INTO BORES

[75] Inventors: Nelson David Bove, Cincinnati, Ohio; Michael R. Linville; James E. Parker, both of Ann Arbor, Mich.

[73] Assignee: Ford Global Technologies, Inc., Dearborn, Mich.

[21] Appl. No.: 08/886,743

[22] Filed: Jul. 1, 1997

[51] Int. Cl.⁶ .................................................. B23P 15/00
[52] U.S. Cl. ........................................ 29/890.124; 29/447
[58] Field of Search .............................. 29/890.124, 447, 29/890.141, 464, 743, 777, 418; 137/625.69

[56] References Cited

U.S. PATENT DOCUMENTS

| | | |
|---|---|---|
| 3,667,103 | 6/1972 | Petree . |
| 3,729,796 | 5/1973 | Sell et al. . |
| 3,856,043 | 12/1974 | Feild et al. . |
| 4,220,178 | 9/1980 | Jackson . |
| 4,446,883 | 5/1984 | Paul, Jr. . |
| 4,693,001 | 9/1987 | Van Ornum . |
| 4,745,681 | 5/1988 | Hollis, Jr. et al. . |
| 4,833,765 | 5/1989 | Bohland . |
| 4,914,809 | 4/1990 | Fukai et al. . |
| 5,292,054 | 3/1994 | Leeb et al. . |
| 5,456,007 | 10/1995 | Bove et al. . |

*Primary Examiner*—I. Cuda
*Attorney, Agent, or Firm*—James J. Dottavio

[57] ABSTRACT

A method and apparatus for assembling a part, such as a spool valve into a bore of a body, such as a transmission valve body. A gripper tool attached to a robotic arm supports the spool valve with a light vacuum pressure and maneuvers the spool valve, aligning it with the valve bore. The gripper vacuum is perturbated to allow the valve to be properly aligned with the bore.

10 Claims, 3 Drawing Sheets

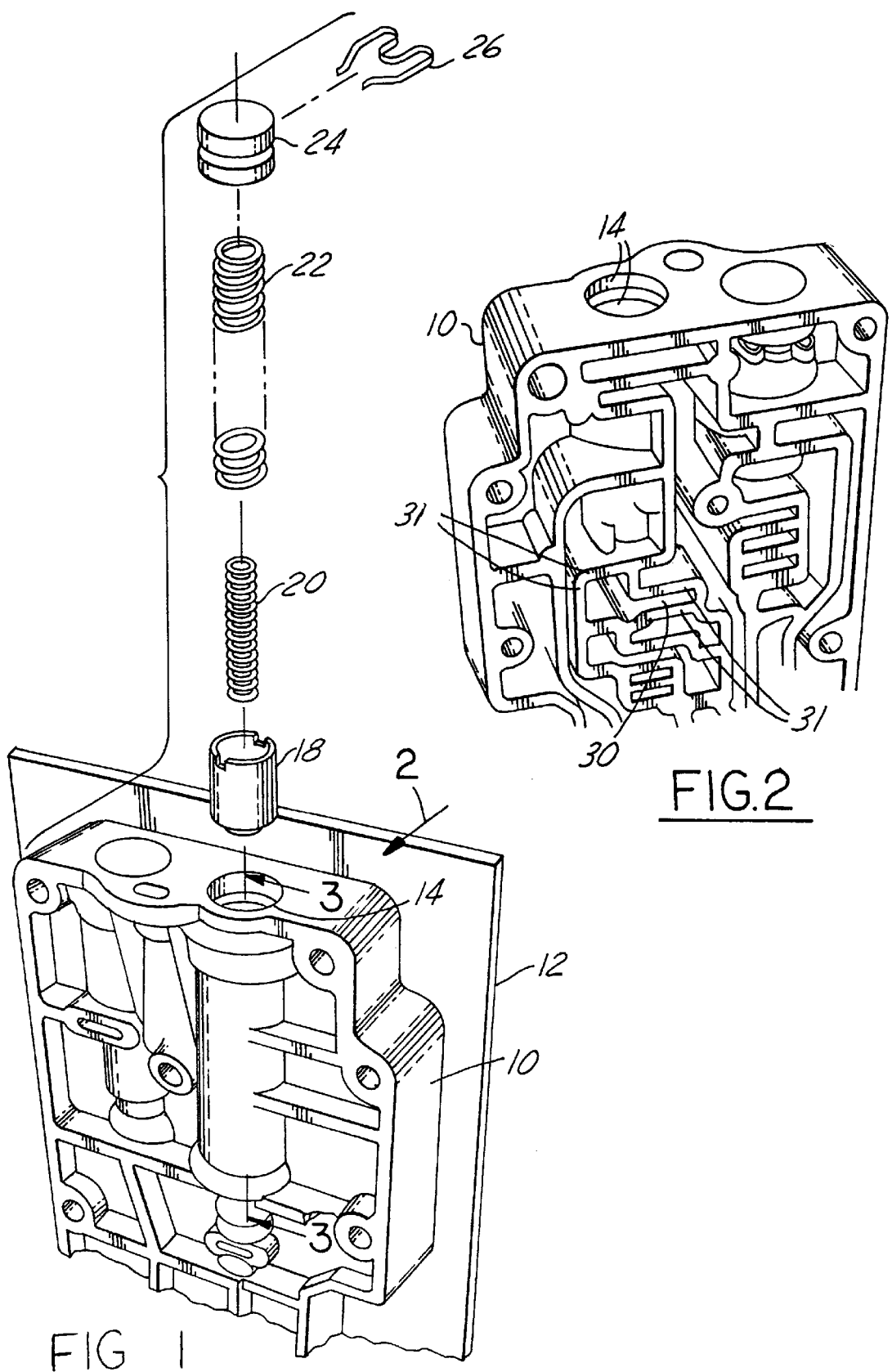

5,901,444

ASSIST METHOD FOR FITTING CLOSE TOLERANCE VALVES INTO BORES

FIELD OF THE INVENTION

The present invention relates to a method and apparatus for assembling vehicle parts using a mechanical means and more particularly for assembling a close tolerance automotive part into a bore of another part using a mechanical means.

BACKGROUND OF THE INVENTION

The assembly of close fitting parts into bores of another part, in particular spool valves into valve bores in transmission valve bodies, is done mainly by hand. Manufacturers have tried to use mechanical insertion devices to avoid the expense of hand assembly. In general, these devices attempt to precisely locate the bore to determine exact alignment just prior to each attempt to place and push a spool valve into the bore. With these devices, any jams that occur while pushing are rectified through force feedback information and through the use of a continual arbitrary search for the correct position and orientation. These devices require exacting precision in locating the bore each time and are still prone to jamming.

Further, a need exists to evacuate foreign matter located within the bore prior to inserting the spool valve into the bore. Neither the hand assembly method nor the prior automated assembly devices serve this purpose while assembling the parts.

A method and apparatus for automating such assembly is disclosed in U.S. Pat. No. 5,456,007, assigned to the assignee of the present invention. Occasionally a valve spool may be misaligned during assembly and not completely seat in the valve body.

The need, then, arises to provide a device that will eliminate the need for hand assembly of close fitting valve spools into valve bores, yet will quickly and reliably locate and insert the spool valves into the bores while avoiding problems with jamming and the need for the exacting precision required with devices that locate and push the spool valves into the bores.

SUMMARY OF THE INVENTION

In its embodiments the present invention contemplates a method of reliably assembling a close fitting part into a bore of a body.

The method includes aligning the part outside of the bore oriented substantially concentric with the bore. A gripper holds the part aligned with the bore. The gripper hold is perturbated so the part is properly aligned with the bore when received into the bore. Preferably a vacuum force sucks the part into the bore.

The invention further contemplates a mechanism for inserting a part into a bore of a body. The mechanism includes a gripper for manipulating the part and vacuum means for creating a vacuum within the bore in the direction of part insertion. The mechanism further includes a motion means for moving the spool valve and substantially aligning it immediately outside of and substantially concentric with the bore, and a means for perturbating the gripper hold when the part is aligned with the bore.

Accordingly, it is an object of the present invention to provide a device that can assembly a part, in particular a spool valve, into a bore of a body, in particular a transmission valve body, perturbating the gripper hold on the part to assist in positioning the part to the bore.

It is an advantage of the present invention that a device can assemble a close fitting part into a bore without the need for hand assembly while avoiding jamming caused by pushing the part into the bore. A misaligned part is realigned so the process is more precise. The clearance between the gripper and the part may be reduced ensuring greater precision.

An additional advantage is the evacuation of foreign matter from the bore during assembly, reducing the risk that foreign matter will interfere with the performance of the part.

BRIEF DESCRIPTION OF THE DRAWINGS

FIG. 1 is a partially exploded perspective view of a transmission valve body and a vacuum plate in accordance with the present invention;

FIG. 2 is a partial perspective view taken in the direction of Arrow 2 in FIG. 1 with the vacuum plate and valve assembly not shown;

DETAILED DESCRIPTION OF THE PREFERRED EMBODIMENTS

Figure 3:
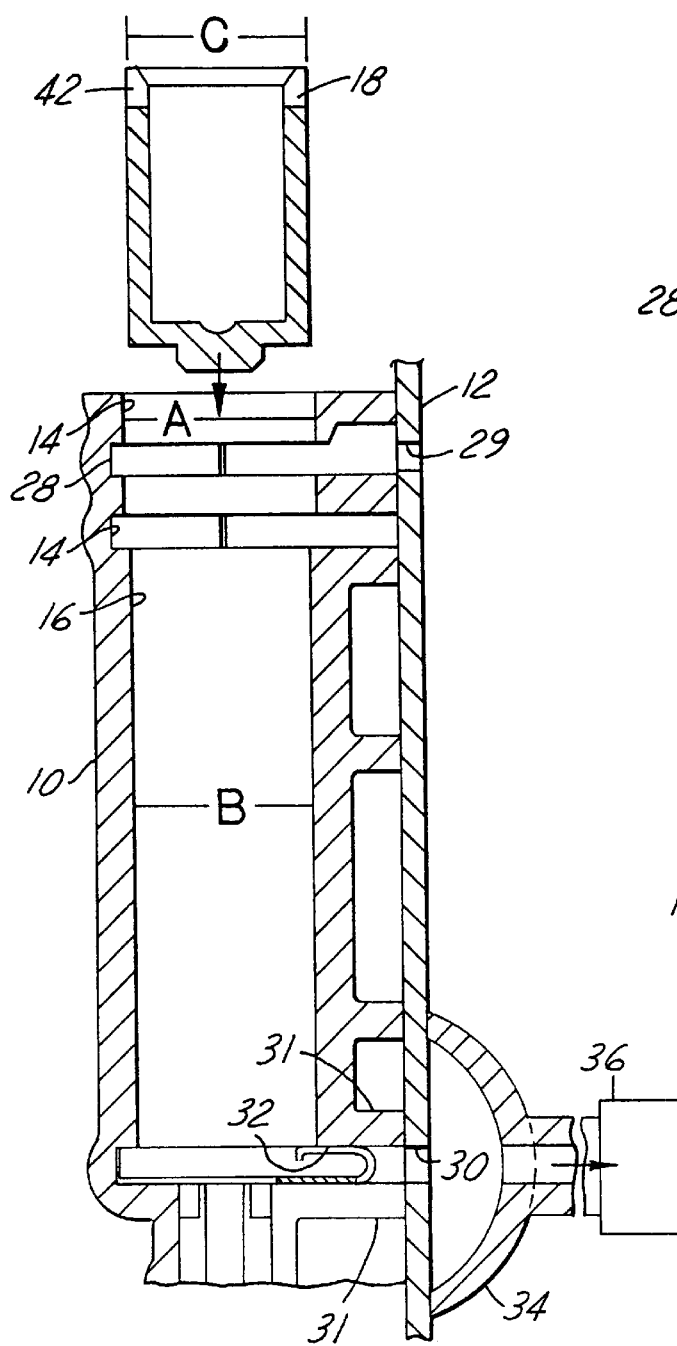
FIG. 3 is a cross-sectional view, on an enlarged scale, taken along line 3—3 in FIG. 1.

As disclosed U.S. Pat. No. 5,456,007, assigned to the assignee of the present invention, which is incorporated herein by reference, a transmission valve body 10 is shown in FIGS. 1–3 mounted to a vacuum plate 12. The transmission valve body 10 includes primary valve bores 14 and a secondary valve bore 16. A spool valve 18 assembles through the primary valve bores 14 and into the secondary valve bore 16. A small spring 20, large spring 22 and a cap 24 then assemble into the bores with a spring clip 26 insertable into a slot 28 in the valve body 10, through an opening 29 in the vacuum plate 12, to secure the cap 24 in place.

The vacuum plate 12 is affixed to valve body 10 in any conventional manner to assure minimal air leakage between plate 12 and flanges 31 in valve body 10. An opening 30 in vacuum plate 12 is aligned with an opening 32 in valve body 10 that extends into secondary bore 16. Affixed to vacuum plate 12 about opening 30 is a vacuum manifold 34, which is further attached to a vacuum suction mechanism 36. Vacuum suction mechanism 36 can be a conventional motor driven air pump similar to pumps used on vacuum cleaners or the like.

The diameters A of primary valve bores 14 are slightly greater than the diameter B of secondary valve bore 16. Diameter C of spool valve 18 is in the range of 0.0007–0.0011 inch diameter smaller than the secondary bore diameter B, with an average of approximately 0.0009 inch difference. This means that the gap between the outer surface of spool valve 18 and the inner surface of secondary bore 16, if they are aligned perfectly concentrically, is 0.00045 inch. This tolerance makes insertion of spool valve 18 into secondary bore 16 without jamming difficult.

Figure 4:
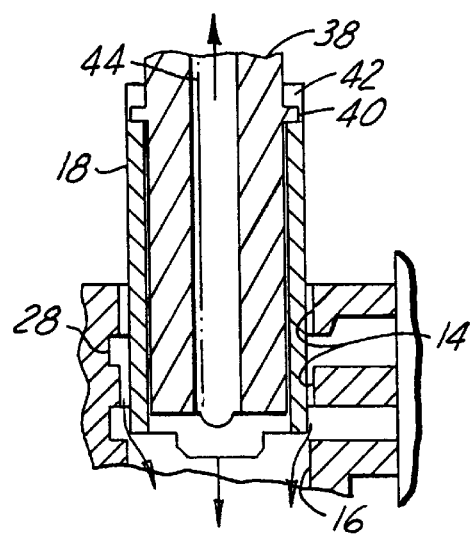
FIG. 4 is a cross-sectional view, on an enlarged scale, showing a valve bore, spool valve and a robotic gripping tool in accordance with the present invention.

FIG. 4 shows spool valve 18 supported by a pilot gripper tool 38. Pilot gripper 38 is cylindrical, has a slightly smaller diameter than the inner diameter of spool valve 18 and includes a pair of pins 40 for aligning with a pair of corresponding slots 42. Through the center of pilot gripper 38 is a vacuum bore 44. A conventional robot with an arm (not shown) is connected to pilot gripper 38 for manipulating the location of pilot gripper 38 and providing a vacuum pressure in vacuum bore 44 when needed.

In operation, a robot arm (not shown) maneuvers pilot gripper 38 in position within-a spool valve 18 that is ready for assembly and then begins pulling a light vacuum through vacuum bore 44. This light vacuum causes pilot gripper 38 to pick up spool valve 18. The arm then prepositions spool valve 18 as precisely and square as possible and lowers spool valve 18 through primary valve bores 14 to within approximately ⅛ of secondary valve bore 16. A typical robot can place the spool valve to within approximately 0.001 inch of the exact location in the lateral direction.

A fluid, such as air, is drawn through secondary bore 16 in the direction of spool valve insertion by vacuum suction mechanism 36. This causes a vacuum, i.e., a negative pressure, within secondary bore 16. The volume of air drawn through secondary bore 16 is sufficient to create a significantly greater vacuum in secondary bore 16 than is in vacuum bore 44. Since pilot gripper 38 on the robot arm holds it only by the light vacuum, it is loose enough to allow spool valve 18 to be aligned and then pulled free from pilot gripper 38 by the larger vacuum in secondary bore 16 and by a gravity force. The spool valve, then, is immediately swallowed into secondary bore 16 of transmission valve body 10 once it is aligned.

Ideally, for ease of assembly, it is desired to have a uniform insertion load across the spool valve face in which the load is always in an axial direction of a bore centerline. This eliminates the problem with spool valve 18 coming in at a jam angle that can occur when trying to push a valve in with mechanical tooling. With a normal robot, any misalignment of the valve when trying to align it immediately prior to insertion will not allow it to push the valve into the bore because of this jamming.

Figure 5:
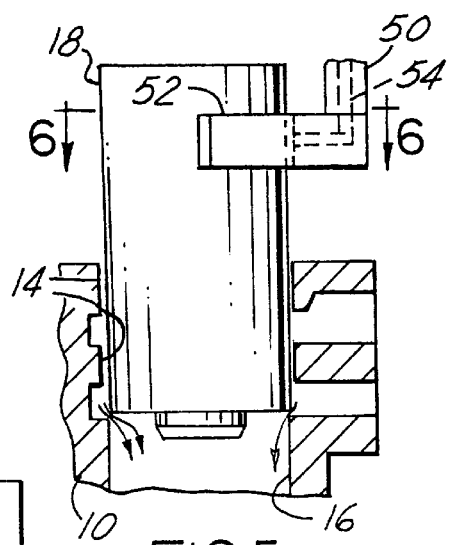
FIG. 5 is a cross-sectional view, on an enlarged scale, of a bore, spool valve and a second embodiment of a robotic gripping tool in accordance with the present invention.

However, by providing a suction in secondary bore 16, any minor misalignment immediately prior to spool valve insertion will cause leakage of air around that side of the valve that provides space for the air to flow through. It is believed that the Bernoulli principle applies here. As shown in FIG. 4, when spool valve 18 is essentially centered and concentric with secondary valve bore 16, the air flow around spool valve 18 into secondary valve bore 16 is essentially the same about its circumference, thus the pressure about spool valve 18 is constant. On the other hand, when spool valve 18 is not centered, as shown in FIG. 5, the air flow will be greater on a first side and essentially non-existent opposite from this first side. The air velocity, then, will be greater on this first side, resulting in a lower pressure on the first side. This lower pressure will cause the valve to move slightly in the direction of this lower pressure thus assisting in centering spool valve 18.

The section of air through secondary bore 16 also provides the added benefit of helping to evacuate secondary bore 16 of any foreign matter that may still be in there due to the valve body fabrication process.

Optionally, just prior to insertion of spool valve 18 into transmission valve body 10, the robot arm can twist pilot gripper 38 back-and-forth about a central longitudinal axis to aid in insertion of spool valve 18.

After insertion of spool valve 18, small spring 20, large spring 22, and cap 24 can be assembled into the bores using conventional mechanical means. Spring clip 26 can then be slid into slot 28 to secure the assembly in place, again using conventional mechanical means if so desired.

Figure 6:
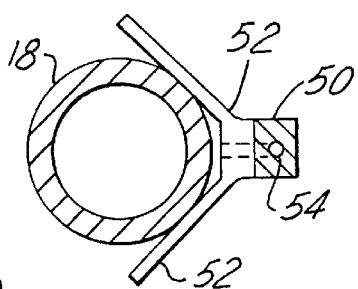
FIG. 6 is a cross-sectional view taken along line 6—6 in FIG. 5.

A second embodiment is shown in FIGS. 5 and 6. In this embodiment, a V-block gripper tool 50 is used to maneuver spool valve 18 instead of a pilot tool gripper. V-block gripper tool 50 includes a pair of V-grips 52, which align spool valve 18 relative to V-block gripper tool 50, and a vacuum bore 54 within V-block gripper tool 50 that includes an opening at the intersection 56 of the two V-grips 52.

In operation, the robot arm (not shown) is moved into position about a spool valve 18 and a light suction is begun in vacuum bore 54. This light suction is sufficient to hold valve spool 18 on V-block gripper tool 50. Then, valve spool 18 is moved over to transmission valve body 10 and dropped down through primary valve bores 14 and stopped approximately ⅛ before secondary valve bore 16. While valve body 10 is being moved into position, vacuum suction mechanism 36 is started and creates a vacuum in secondary valve bore 16. The low vacuum in shear holding valve spool 18 on V-block 50 will allow valve spool 18 to slip loose somewhat from V-grips 52, until it aligns with secondary bore 16 and then is completely sheared from V-grips 52 and received in secondary valve bore 16. Again, the Bernoulli Effect is believed to assist in aligning spool valve 18 with secondary valve bore 16.

To assist with the alignment, spool valve 18 can additionally be moved by the robot arm in a rotary orbital spiral motion about a central longitudinal axis of spool valve 18. Preferably, it would spiral in increasing circles of ⅟1000 inch increase in diameter per cycle around valve bore 16 using the light suction to hold it to gripper 50 until valve 18 is aligned with secondary bore 16 sufficiently enough to allow it to be received into bore 16. Further, the twisting motion discussed relative to the first embodiment could also be used in this embodiment if so desired.

Figure 7:
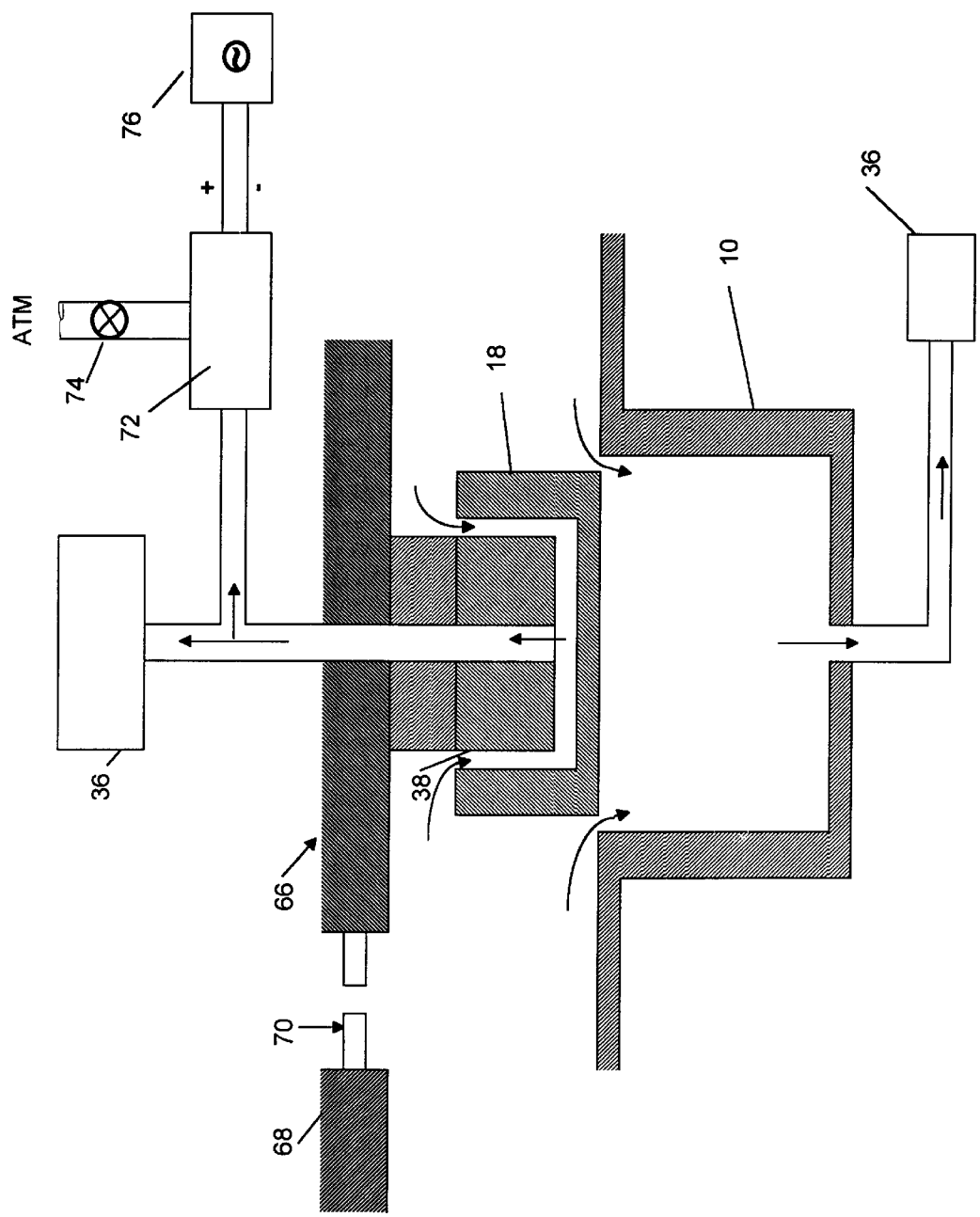
FIG. 7 is a schematic representation of a vacuum system according to an embodiment of the present invention.

In each of the embodiments described above, a preferred vacuum system as illustrated in FIG. 7 is provided. A vacuum suction mechanism 36 supports the spool valve 18 by the gripper mechanism 38 as described above. A control valve 74 is provided to vent the suction 36 to atmosphere when desired. A frequency generator 76 generates a signal to control a solenoid 72 which selectively opens the control valve 74 to vent to atmosphere. In a preferred embodiment, the signal comprises a sine wave with a frequency of 2–10 Hz. The duty cycle is 50% on and 50% off. The frequency and duty cycle of any such signal is application specific, as appreciated by one skilled in the art. When the control valve 74 vents to atmosphere, vacuum is momentarily removed from the gripper 38 holding the valve 18. Gravity and the force generated by the vacuum in the valve body bore pulls the valve 18 into the bore as described above. Alternatively, one skilled in the art may modify the system described above to use gravity alone to pull the valve 18 into the valve body 10 without vacuum.

The frequency generator 76 generates an on/off signal which cycles the solenoid 72 to open and close the control valve 74. The on/off cycle perturbates the hold that the gripper 38 has on the valve 18. The cycling of the vacuum enables the gripper 38 to pick and replace, or walk, the valve 18 into the center position of the bore. This reduces the time and effort required to center the valve over the bore.

This perturbation signal generated by the frequency generator 76 also permits the gripper to lift and release the valve 18 if the valve 18 hangs up on the edge of the bore. The valve 18 may hang up when it is initially lowered into nominal position and pulled off the robot 66 by the vacuum in the bore. The valve 18 is lifted by the vacuum generated in response to the perturbation signal, and the valve 18 is permitted to drop and be inserted into the bore using the vacuum as described above.

A preferred installation sequence includes picking up the valve 18 using the robotic gripper 38. The robot positions the valve 18 at a nominal position over the valve bore. The robot head 66 is lowered until the main vacuum forces exceed the force holding the valve 18 to the gripper 38 and the valve 18 is pulled from the gripper 38. If, when dropped, the valve 18 enters the bore, the process is complete. If the valve 18 did not completely enter the bore, the perturbation signal is started and the robotic head 66 begins a search pattern to find the bore centerline as described above. Because the perturbation signal may cause the valve 18 to be released from the gripper 38 without the necessity of overcoming the gripper vacuum force, the clearance between the valve 18 and the robotic head 66 may be reduced.

In an alternative embodiment, a sensor 70, such as a proximity microswitch or optical sensor, detects the position of the robot head 66. When the sensor 70 detects proper positioning, the perturbation cycle begins until the valve 18 is within the bore, thereby eliminating the need to overcome the vacuum of the gripper 38 as described above.

In a further alternative embodiment, the perturbation principle described above may be modified with other non-vacuum placement systems. For example, a mechanical gripper may be provided to hold the valve in an alternative system. The gripper mechanically grips and releases the valve repeatedly until the valve 18 is dropped into the bore. Similarly, electromagnetic fields may used to hold some valves 18. In such a system, the field would be alternated on and off repeatedly until the valve is released into the bore as described above.

While certain embodiments of the present invention have been described in detail, those familiar with the art to which this invention relates will recognize various alternative designs and embodiments for practicing the invention as defined by the following claims.

We claim:

1. An automated method of assembling a spool valve into a valve bore of a vehicle transmission body comprising:

applying a holding force to the spool valve;

aligning the spool valve immediately outside of the bore oriented substantially concentric with the bore;

beginning vacuum suction in the bore in the direction of insertion of the spool valve; and alternately removing and applying the holding force on the spool valve until the spool valve is received into the bore.

2. An automated method of assembling a close fitting part into a bore of a body comprising:

applying a holding force to the part;

aligning the part immediately outside of the bore oriented substantially concentric with the bore;

beginning vacuum suction in the bore in the direction of insertion of the part; and alternately removing and applying the holding force on the part until the part is received into the bore.

3. A method according to claim 1 wherein the part is pulled into the bore with the suction and a gravity force.

4. A method according to claim 1 further comprising the step of sensing when the part is aligned outside of the bore oriented substantially concentric with the bore prior to perturbating the hold on the part.

5. A method according to claim 2 further comprising the step of holding the part by a suction mechanism prior to receiving the part into the bore.

6. A method according to claim 5 wherein the step of holding the part comprises sucking up the part on a pilot gripper tool and maneuvering the part with the pilot gripper tool.

7. A method according to claim 5 wherein the step of supporting the part comprises picking up the part with a V-block gripper tool and maneuvering the part with the V-block gripper tool.

8. A method according to claim 1 further comprising the step of twisting the part back-and-forth until the part is received into the bore.

9. A method according to claim 1 further comprising the step of moving the part in a spiral motion about a central longitudinal axis of the part of progressively increasing diameter until the part is received into the bore.

10. A method according to claim 2 further comprising evacuating foreign matter from the bore prior to receiving the part into the bore.

* * * * *